(12) United States Patent
Hofmann et al.

(10) Patent No.: US 12,523,234 B2
(45) Date of Patent: Jan. 13, 2026

(54) BEARING ASSEMBLY

(71) Applicant: AKTIEBOLAGET SKF, Gothenburg (SE)

(72) Inventors: Gregory Hofmann, Telford, PA (US); Hans Wallin, Cape Coral, FL (US); Benkui Xia, Nanjing (CN); Jingwen Zhang, Shanghai (CN)

(73) Assignee: AKTIEBOLAGET SKF, Gothenburg (SE)

( * ) Notice: Subject to any disclaimer, the term of this patent is extended or adjusted under 35 U.S.C. 154(b) by 1 day.

(21) Appl. No.: 18/122,901

(22) Filed: Mar. 17, 2023

(65) Prior Publication Data

US 2023/0304505 A1 Sep. 28, 2023

(30) Foreign Application Priority Data

Mar. 24, 2022 (CN) .......................... 202210297574.4

(51) Int. Cl.
*F04D 29/06* (2006.01)
*F04D 25/06* (2006.01)
*F16C 19/18* (2006.01)

(52) U.S. Cl.
CPC ............. *F04D 29/06* (2013.01); *F04D 25/06* (2013.01); *F16C 19/18* (2013.01); *F16C 2360/44* (2013.01)

(58) Field of Classification Search
CPC ........ F04D 29/06; F04D 25/06; F04D 17/122; F04D 29/051; F04D 29/059; F04D 17/10; F04D 29/056; F16C 19/18; F16C 2360/44; F16C 19/543; F16C 19/548; F16C 33/6659; F16C 2240/34; F16C 19/184; F16C 19/182
See application file for complete search history.

(56) References Cited

U.S. PATENT DOCUMENTS 5,273,413 A * 12/1993 Wallin ................... F16C 19/163
384/615
2009/0081040 A1* 3/2009 Ueno ....................... F16C 19/55
415/229

(Continued)

FOREIGN PATENT DOCUMENTS

JP 2015151998 A * 8/2015

OTHER PUBLICATIONS

Raw Machine Translation of JP2015151998 (A); Tsuruga Yoshiyuki ; Heat Pump Compressor , Aug. 24, 2015.*

*Primary Examiner* — Charles G Freay
*Assistant Examiner* — Lilya Pekarskaya
(74) *Attorney, Agent, or Firm* — J-TEK LAW PLLC; Scott T. Wakeman; Mark A. Ussai

(57) ABSTRACT

A bearing assembly includes a first bearing unit and a second bearing unit for supporting a shaft, in particular a rotor shaft within a centrifugal compressor in which an axial load acts on the shaft in a first or a second axial direction, the second axial direction being opposite to the first axial direction. When the axial load acts in the first axial direction, the first bearing unit is configured to support both an axial load and a radial load and the second bearing unit is configured to support a radial load. Alternatively, when the axial load acts in the second axial direction, the first bearing unit is configured to support a radial load and the second bearing unit is configured to support both an axial load and a radial load.

10 Claims, 2 Drawing Sheets

(56) References Cited

U.S. PATENT DOCUMENTS

| | | | |
|---|---|---|---|
| 2013/0170943 A1* | 7/2013 | Jonsson | F04D 29/058 |
| | | | 415/1 |
| 2015/0167687 A1* | 6/2015 | Kurihara | F04D 29/056 |
| | | | 415/229 |
| 2016/0160857 A1* | 6/2016 | Wallin | F04D 29/063 |
| | | | 184/6.16 |
| 2019/0186536 A1* | 6/2019 | Hauleitner | F16C 33/6688 |
| 2021/0079953 A1* | 3/2021 | Wallin | F16C 33/664 |
| 2021/0156429 A1* | 5/2021 | Benkui | F16C 19/166 |

* cited by examiner

BEARING ASSEMBLY

CROSS-REFERENCE

This application claims priority to Chinese patent application no. 202210297574.4 filed on Mar. 24, 2022, the contents of which are fully incorporated herein by reference.

BACKGROUND OF THE INVENTION

The present invention relates to a bearing assembly, in particular a bearing assembly for supporting a shaft, such as for example, a compressor shaft.

Devices such as compressors, for example, centrifugal compressors, typically include a shaft or rotor shaft supported by one or more bearings. In centrifugal compressors, the shaft may be subjected to an axial load which predominantly acts in one axial direction, but under certain operating conditions, the axial load may reverse and act in the opposite direction. The axial load is primarily produced by gear forces, in case of gear drive, and gas forces acting on the impeller(s). There are also radial loads primarily produced the weight of components.

A conventional bearing arrangement, which may support an axial load in one or the other direction, may comprise one fixed pair of angular contact ball bearings for supporting the axial load and one floating pair of angular contact ball bearings which support radial loads only. With such an arrangement, the axial load is applied to the fixed pair of bearings in either case, i.e., also when the axial load reverses. This means that the fixed pair of bearing must be designed to take axial load in both directions.

SUMMARY OF THE INVENTION

It is therefore object of the present invention to provide an improved bearing arrangement with a balanced load distribution.

The bearing assembly comprises a first and a second bearing unit for supporting a shaft, in particular a rotor shaft within a centrifugal compressor. The first and the second bearing unit each comprise at least one inner ring being arranged on the shaft, at least one outer ring, which may be accommodated in a housing of the compressor, and at least one row of rolling elements being arranged between the inner and the outer ring. During operation, an axial load may act on the shaft in a first or a second axial direction, wherein the second axial direction is opposite to the first axial direction. This axial load leads to an axial load and a radial load acting on the bearing units. The axial load acting on the shaft may arise from gas forces acing on the impeller(s). Between the first and the second bearing unit, the motor rotor of a centrifugal compressor may be arranged.

In order to allow a uniform distribution of the load, the first bearing unit is configured to support an axial load and a radial load, and the second bearing unit is configured to support a radial load when the axial load acts in the first axial direction. Alternatively, when the axial load acts in the second axial direction, e.g., when the axial load reverses as it may happen under certain operating conditions, the first bearing unit is configured to support a radial load, and the second bearing unit is configured to support an axial load and a radial load. This cross location arrangement and cross distribution has the advantage that both bearing units have the ability to support radial as well as axial loads, in contrast to previously known bearing assemblies where one bearing unit could support only radial loads as described above.

According to an embodiment, the first bearing unit is a double row bearing with a first and a second bearing, i.e., a first pair of bearings, and/or the second bearing unit is a double row bearing with a first and a second bearing, i.e., a second pair of bearings. In this case, each bearing unit or pair of bearings may comprise two inner and two outer rings, one inner and outer ring for each bearing. Between the bearings of one bearing unit, a spacer ring may be arranged which may comprise one or more passages for supplying lubricant to the bearings.

This arrangement, in which each bearing unit is arranged or formed as a pair of bearings, is advantageous to control bearing operating clearance, internal bearing load distribution, internal sliding, and shaft displacement, both axial and radial. Under axial load, one bearing of a pair of bearings takes axial load while the other, the so-called "backup" bearing, provides control of clearance. Further, both bearings support radial loads. This arrangement applies to both bearing units, wherein the first bearing unit takes or supports axial load when the axial load is in the first direction and the second bearing unit takes/supports axial load when the axial load is in the second direction.

The first bearing and the second bearing of the first bearing unit may be angular contact ball bearings and/or the first bearing and the second bearing of the second bearing unit may be angular contact ball bearings. Angular contact ball bearings provide the advantage that they may withstand or support combined loads, that is, radial and axial loads acting simultaneously, and may particularly be used for high speed and high precision applications like centrifugal compressors.

According to a further embodiment, the axially outer angular contact ball bearings have a first contact angle and the axially inner angular contact ball bearings have a second contact angle, wherein the first and the second contact angle are different.

In angular contact ball bearings, under rotation, there is an axial bearing load induced by centrifugal forces on the balls. The induced force increases with contact angle and speed and adds to the axial load of the load carrying bearing.

Further, the axial load carrying capacity of angular contact ball bearings increases with increasing contact angle while the radial load capacity decreases with increasing contact angle. The contact angle is defined as the angle between the line connecting the point of contact of the ball and the raceway in the radial plane angle.

Therefore, it is particularly preferred when one of the contact angles is higher than the other so that one bearing of each bearing unit is particularly adapted for axial loads and the other bearing is particularly adapted for radial loads. This provides an increase in the axial load capacity due to the optimization of the bearings with respect to axial and radial loads.

This means that to optimize the axial load capacity for each angular contact ball bearing pair, according to this embodiment, the load carrying bearing has a large contact angle while the backup bearing has a small contact angle to minimize the induced axial load. This arrangement provides increased axial load capacity for the pair of bearings compared to a pair of bearings with equal contact angles.

In previous bearing arrangements, with one fixed and one floating bearing unit, such an arrangement with different contact angles had disadvantages when the axial load reverses direction. This was the case as only one of the bearing units was able to support axial load and the bearing with the smaller contact angle became the load carrying bearing and the bearing with the large contact angel became the backup bearing.

In contrast to this previous arrangement, the bearing assembly of the herein described embodiment provides an arrangement with the advantage of different contact angles for loads in both directions. This is made possible by having identical bearing pairs with different contact angles with the pairs arranged in cross location. When the load is in one direction that bearing pair carries the axial load and the opposite pair takes radial load only. When the load reverses, the pair on the reverse side carries the axial load and the opposite pair takes radial only.

For example, the difference between the contact angles may be 10 to 15 degrees. For example, the greater contact angle may have a value of 25 degrees and the lesser contact angle may have a value of 15 degrees or the greater contact angle may be 40 degrees and the lower contact angle may be 25 degrees.

According to a further embodiment, the first bearing of the first bearing unit may be the axially outer bearing, and the second bearing of the second bearing unit may be the axially outer bearing. The respective outer bearings may abut against an abutment which may be configured to prevent a displacement of the respective bearing units in one direction. A first and/or a second axial abutment may be a respective shoulder formed on a housing of the compressor.

A clearance or gap may be provided between the first bearing of the first bearing unit and the first axial abutment and/or between the second bearing of the second bearing unit and the second axial abutment. Such a clearance has the effect that the first bearing of the first bearing unit and/or the second bearing of the second bearing unit are not preloaded. Due to the clearance, the first bearing of the first bearing unit and/or the second bearing of the second bearing unit may move slightly towards the respective abutment and may also move slightly away from the respective abutment.

According to a further embodiment, the second bearing of the first bearing unit is the axially inner bearing and is configured to be a thrust bearing. Further, the first bearing of the second bearing unit may be the axially inner bearing and may be configured to be a thrust bearing. In contrast to that, the respective outer bearings are configured to be backup bearings. This provides an improved cross arrangement of backup bearings and thrust bearings, preferably together with a cross arrangement with respect to the contact angles as described above. Such a cross arrangement provides an improved distribution of axial and radial loads compared to previous bearing assemblies without such a cross arrangement.

Further, the direction of the axial load applied to the shaft may change without any negative impact to the bearing units as each bearing unit may support axial as well as radial loads by having one bearing specialized for both axial loads and radial loads and one bearing specialized for radial loads only.

Further advantages and advantageous embodiments are specified in the description, the drawings, and the claims. Here in particular the combinations of features specified in the description and in the drawings are purely exemplary, so that the features may also be present individually or combined in other ways.

BRIEF DESCRIPTION OF THE SEVERAL VIEWS OF THE DRAWINGS

In the following the invention is described in more detail using the exemplary embodiments depicted in the drawings. Here the exemplary embodiments and the combinations shown in the exemplary embodiments are purely exemplary and are not intended to define the scope of the invention. This scope is defined solely by the pending claims.

DETAILED DESCRIPTION OF THE INVENTION

In the following, identical or functionally equivalent elements are designated by the same reference numbers.

Figure 1:
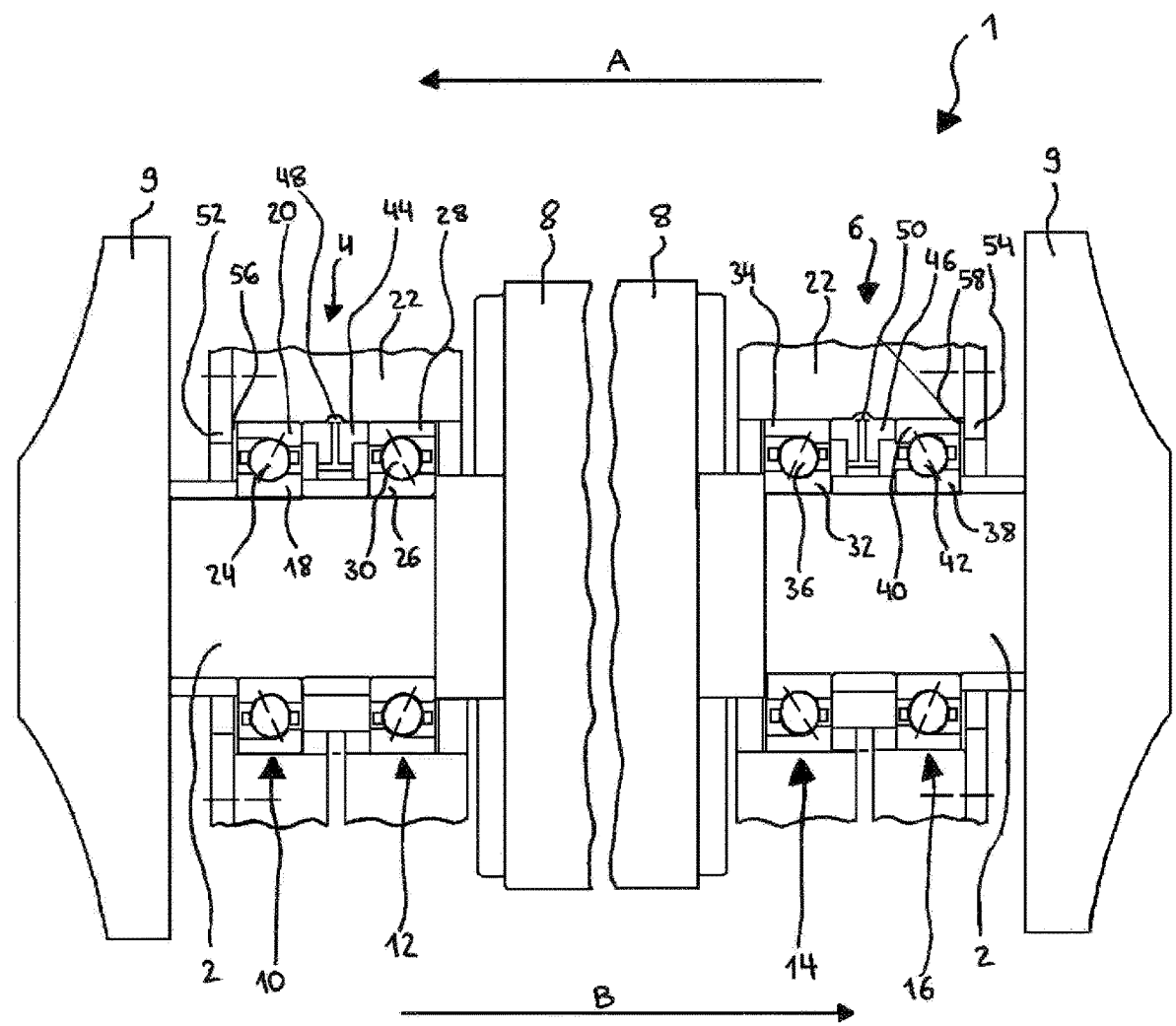
FIG. 1 shows a sectional view of a bearing assembly including a first and a second bearing unit.

FIG. 1 shows a bearing assembly 1 which may be used for supporting a shaft 2, in particular a rotor shaft 2 within a centrifugal compressor. The bearing assembly 1 comprises a first bearing unit 4 and a second bearing unit 6 being arranged on the shaft 2 on both sides of a motor 8; that is, each bearing unit 4, 6 is disposed on separate axial side of the motor 8. At the respective other side of the first and the second bearing unit 4, 6, impellers 9 of a centrifugal compressor may be arranged. In other words, the first bearing unit 4 is disposed between the central motor 8 and one impeller 9 and the second bearing unit 6 is disposed between the motor 8 and another impeller 9. In such a compressor, during operation, an axial load may act on the shaft 2 either in a first axial direction (indicated by arrow A) or a second axial direction (indicated by arrow B), the second axial direction B being opposite to the first axial direction A.

The first bearing unit 4 consists of two angular contact ball bearings 10, 12 and the second bearing unit 6 consists of two angular contact ball bearings 14, 16. The bearings 10, 12 and 14, 16 are arranged in a cross arrangement so that both bearing units 4, 6 have the ability to support radial as well as axial loads, as described as follows.

The first bearing 10 of the first bearing unit 4 comprises an inner ring 18 disposed on the shaft 2, an outer ring 20, which may be accommodated in a housing 22 of the compressor, and one row of balls 24 arranged between the inner ring 18 and the outer ring 20. The second bearing 12 of the first bearing unit 4 also comprises an inner ring 26 disposed on the shaft 2, an outer ring 28 accommodated in the housing 22 of the compressor, and one row of balls 30 arranged between the inner ring 26 and the outer ring 28.

Similarly, the first bearing 14 of the second bearing unit 6 comprises an inner ring 32 disposed on the shaft 2, an outer ring 34 in the housing 22 of the compressor, and one row of balls 36 arranged between the inner ring 32 and the outer ring 34. The second bearing 16 of the second bearing unit 6 also comprises an inner ring 38 disposed on the shaft 2, an outer ring 40 accommodated in the housing 22 of the compressor, and one row of balls 42 arranged between the inner ring 38 and the outer ring 40.

A spacer ring 44 may be arranged or disposed between the first bearing 10 and the second bearing 12 of the first bearing unit 4, the spacer ring 44 including at least one lubricant supply passage 48 for supplying lubricant to the bearings 10, 12. Further, another spacer ring 46 may be arranged or disposed between the first bearing 14 and the second bearing 16 of the second bearing unit 6, the spacer ring 46 including at least one lubricant supply passage 50 for supplying lubricant to the bearings 14, 16.

An axial load acting on the shaft 2 leads to both an axial load and a radial load acting on the bearing units 4, 6. In order to allow or provide a uniform distribution of the load, as well as support of the axial load when the direction of the axial load reverses, the first bearing unit 4 is configured to support both an axial load and a radial load and the second bearing unit 6 is configured to support a radial load when the axial load acts in the first axial direction A. Alternatively, when the axial load acts in the second axial direction B, the first bearing unit 4 is configured to support a radial load and the second bearing unit 6 is configured to support both an axial load and a radial load.

The capability of supporting axial loads as well as radial loads may be achieved by the present bearing assembly 1 being formed or configured having a cross arrangement of thrust bearings and backup bearings as described as follows.

The first bearing 10 of the first bearing unit 4 is an axially outer bearing and is configured as a "backup" bearing, the bearing 10 abutting against a first axial abutment 52. Similarly, the second bearing 16 of the second bearing unit 6 is also an axially outer bearing and is configured as a backup bearing, the bearing 16 abutting against a second axial abutment 54. The abutments 52, 54 may be provided, for example, by a respective shoulder formed on the housing 22. The abutments 52, 54 may prevent a displacement of the bearing units 4, 6. Preferably, a clearance 56 is provided between the first bearing 10 of the first bearing unit 4 and the first axial abutment 52 and a clearance 58 is provided between the second bearing 16 of the second bearing unit 6 and the second axial abutment 54. Such a clearance or axial gap 56, 58 has the effect that each one of the first bearing unit 4 and the second bearing unit 6 is not preloaded.

When an axial load is applied in the first axial direction A, the first bearing 10 of the first bearing unit 4 serves as a backup bearing and supports a radial load only and the second bearing 12 of the first bearing unit 4 serves as a "thrust" bearing and supports both an axial load and a radial load. Alternatively, when an axial load is applied in the second axial direction B, the second bearing 16 of the second bearing unit 6 serves as a backup bearing and supports a radial load only and the first bearing 14 of the second bearing unit 6 serves as a thrust bearing and supports both an axial load and a radial load.

Due to this cross arrangement of thrust and backup bearings, the direction A, B of the axial load applied to the shaft 2 may change without any negative impact to the bearing units 4, 6 as each bearing unit 4, 6 may support axial as well as radial loads by having one bearing 12, 14 specialized for supporting both axial loads and radial loads and one bearing 10, 16 specialized for supporting radial loads only.

Figure 2:
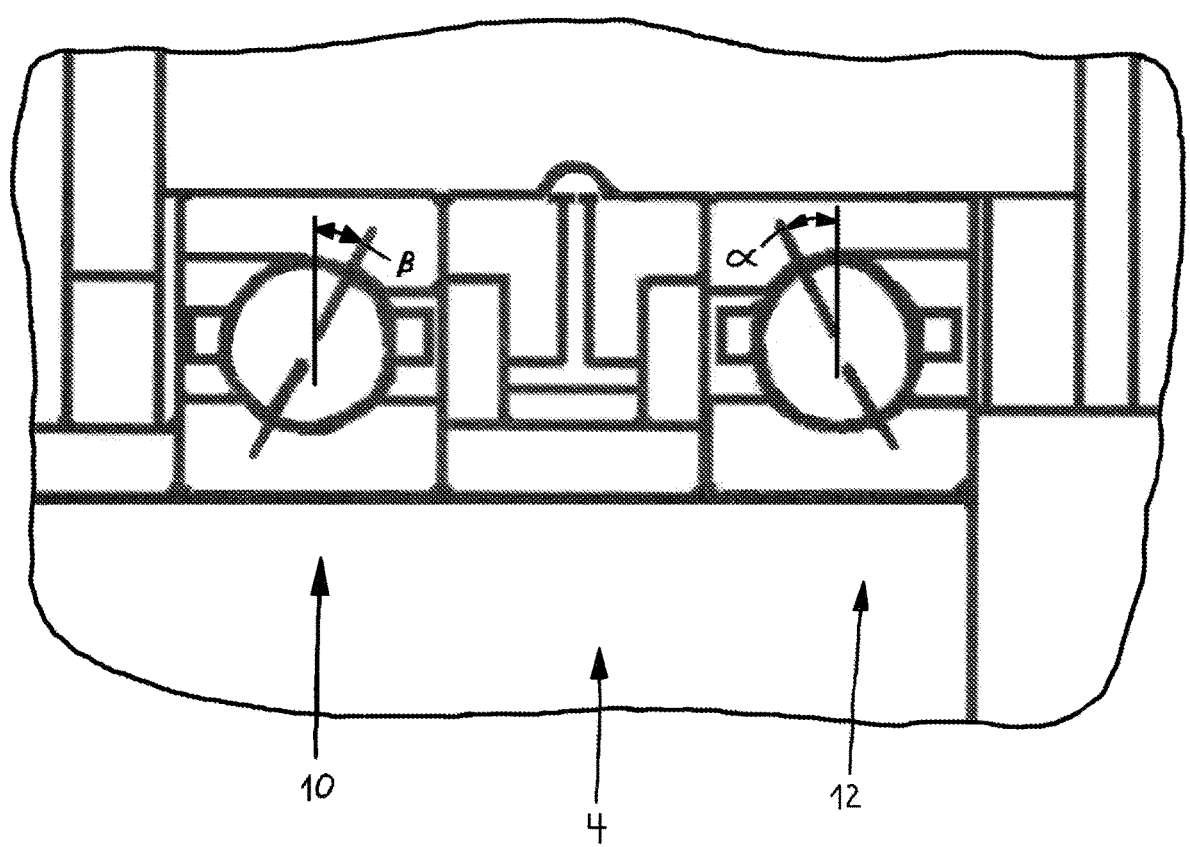
FIG. 2 shows a broken-away, greatly enlarged portion of FIG. 1.

This effect may be enhanced by having different contact angles of the angular contact ball bearings 10, 12, 14, 16 as the axial load carrying capacity of angular contact ball bearings increases with increasing contact angle. Thus, the thrust bearings 12, 14 may each be formed having a contact angle $\alpha$ with a value greater than the value of a contact angle $\beta$ of each of the backup bearings 10, 16 in order to increase the axial load carrying capacity of the bearings 12, 14, as depicted in FIG. 2 for the first bearing unit 4.

For example, each thrust bearing 12, 14 may have a contact angle $\alpha$ with a value of twenty-five degrees (25°) and each backup bearing 10, 16 may have a contact angle $\beta$ with a value of fifteen degrees (15°). Further for example, each thrust bearing 12, 14 may have a contact angle $\alpha$ with a value of forty degrees (40°) and each backup bearing 10, 16 may have a contact angle $\beta$ with a value of twenty-five degrees (25°). Thus, the contact angles $\alpha$, $\beta$ preferably have a difference in value within the range of between ten degrees (10°) and fifteen degrees (15°).

The above-described bearing assembly provides an improved cross location arrangement of bearing units, preferably by a combination of a cross location arrangement of different contact angles as well as backup and thrust bearings. Such a cross arrangement provides an improved distribution of axial and radial loads as well as the capability of changing the direction of the axial load applied to the shaft without any negative impact to the bearing units.

Representative, non-limiting examples of the present invention were described above in detail with reference to the attached drawings. This detailed description is merely intended to teach a person of skill in the art further details for practicing preferred aspects of the present teachings and is not intended to limit the scope of the invention.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter. The invention is not restricted to the above-described embodiments, and may be varied within the scope of the following claims.

REFERENCE NUMBER LIST 1 bearing assembly
2 shaft
4 first bearing unit
6 second bearing unit
8 motor
9 impeller
10 first angular contact ball bearing of first bearing unit
12 second angular contact ball bearing of first bearing unit
14 first angular contact ball bearing of second bearing unit
16 second angular contact ball bearing of second bearing unit
18 inner ring
20 outer ring
22 housing
24 balls
26 inner ring
28 outer ring
30 balls
32 inner ring
34 outer ring
36 balls
38 inner ring
40 outer ring
42 balls
44 spacer ring
46 spacer ring
48 lubricant passage 50 lubricant passage
52 abutment
54 abutment
56 clearance
58 clearance
A first axial direction
B second axial direction
α contact angle of bearings 12, 14
β contact angle of bearings 10, 16

We claim:

1. A centrifugal compressor comprising:
a rotor shaft having two opposing axial ends;
a motor mounted centrally on the rotor shaft;
a first impeller mounted on the rotor shaft and spaced from the motor in a first axial direction and a second impeller mounted on the rotor shaft and spaced from the motor in a second, opposing axial direction;
a first bearing unit mounted on the rotor shaft between the motor and the first impeller, the first bearing unit being configured to support both radial and axial loads when an axial load acts on the rotor shaft in the first axial direction and to support only a radial load when the axial load acts on the rotor shaft in the second axial direction; and
a second bearing unit mounted on the rotor shaft between the motor and the second impeller, the second bearing unit being configured to support only a radial load when the axial load acts on the rotor shaft in the first axial direction and to support both radial and axial loads when the axial load acts on the rotor shaft in the second axial direction;
wherein the first bearing unit is a double row bearing including a first, axially outer angular contact bearing and a second, axially inner angular contact bearing, the first and second angular contact bearings being arranged in a back to back configuration and an axial clearance being defined between an outer ring of the first angular contact bearing and an axial abutment located axially outwardly of the first bearing unit such that when the axial load acts on the rotor shaft in the first axial direction, the first angular contact bearing is configured to support the radial load only and the second angular contact bearing supports the axial load and the radial load while the second bearing unit supports the radial load only; and
wherein the second bearing unit is a double row bearing including a first, axially inner angular contact bearing and a second, axially outer angular contact bearing, the first and second angular contact bearings of the second bearing unit being arranged in a back to back configuration and an axial clearance being defined between an outer ring of the second angular contact bearing of the second bearing unit and an axial abutment located axially outwardly of the second bearing unit such that when the axial load acts on the rotor shaft in the second, opposing axial direction, the second angular contact bearing of the second bearing unit is configured to support the radial load only and the first angular contact bearing of the second bearing unit supports the axial load and the radial load while the first bearing unit supports the radial load only.

2. The centrifugal compressor according to claim 1, wherein:
the first bearing of the first bearing unit has a contact angle with a value and the second bearing of the first bearing unit has a contact angle with a value that is different than the value of the contact angle of the first bearing; and
the second bearing of the second bearing unit has a contact angle with a value and the first bearing of the second bearing unit has a contact angle with a value that is different than the value of the contact angle of the second bearing of the second bearing unit.

3. The centrifugal compressor according to claim 2, wherein:
the value of the contact angle of the second bearing of the first bearing unit is greater than the value of the contact angle of the first bearing of the first bearing unit; and
the value of the contact angle of the first bearing of the second bearing unit is greater than the value of the contact angle of the second bearing of the second bearing unit.

4. A bearing assembly for a centrifugal compressor, the compressor having a rotor shaft, the bearing assembly comprising:
first and second bearing units for supporting the rotor shaft;
wherein the first bearing unit is a double row bearing including a first, radially outer angular contact bearing and a second, radially inner angular contact bearing, the first and second angular contact bearings being arranged in a back to back configuration and an axial clearance being defined between an outer ring of the first angular contact bearing and an axial abutment located axially outwardly of the first bearing unit such that when an axial load acts on the rotor shaft in a first axial direction, the first angular contact bearing is configured to support a radial load only and the second angular contact bearing supports an axial load and a radial load while the second bearing unit supports a radial load only; and
wherein the second bearing unit is a double row bearing including a first, radially inner angular contact bearing and a second, radially outer angular contact bearing, the first and second angular contact bearings of the second bearing unit being arranged in a back to back configuration and an axial clearance being defined between an outer ring of the second angular contact bearing of the second bearing unit and an axial abutment located axially outwardly of the second bearing unit such that when an axial load acts on the rotor shaft in a second, opposing axial direction, the second angular contact bearing of the second bearing unit is configured to support a radial load only and the first angular contact bearing of the second bearing unit supports an axial load and a radial load while the first bearing unit supports a radial load only.

5. The bearing assembly according to claim 4, wherein:
the first bearing of the first bearing unit has a contact angle with a value and the second bearing of the first bearing unit has a contact angle with a value that is different than the value of the contact angle of the first bearing; and
the second bearing of the second bearing unit has a contact angle with a value and the first bearing of the second bearing unit has a contact angle with a value that is different than the value of the contact angle of the second bearing of the second bearing unit.

6. The bearing assembly according to claim 5, wherein:
the value of the contact angle of the second bearing of the first bearing unit is greater than the value of the contact angle of the first bearing of the first bearing unit; and the value of the contact angle of the first bearing of the second bearing unit is greater than the value of the contact angle of the second bearing of the second bearing unit.

7. The bearing assembly according to claim 4 wherein:
the first bearing unit is disposed between the motor and an impeller mounted on the rotor shaft and spaced axially from the motor in the first axial direction; and
the second bearing unit is disposed between the motor and another impeller mounted on the rotor shaft and spaced axially from the motor in the second axial direction.

8. The bearing assembly according to claim 4, wherein the second bearing of the first bearing unit is configured to be a thrust bearing and the first bearing of the first bearing unit is configured to be a backup bearing.

9. The bearing assembly according to claim 4, wherein the first bearing of the second bearing unit is configured to be a thrust bearing and the second bearing of the second bearing unit is configured to be a backup bearing.

10. The bearing assembly according to claim 4, further comprising a spacer ring with a lubricant supply passage disposed between the first and second bearings of the first bearing unit and/or a spacer ring with a lubricant supply passage disposed between the first and second bearings of the second bearing unit.

* * * * *